United States Patent
Liu et al.

(10) Patent No.: US 6,746,506 B2
(45) Date of Patent: Jun. 8, 2004

(54) BLENDED POWDER SOLID-SUPERSOLIDUS LIQUID PHASE SINTERING

(75) Inventors: Jianxin Liu, N. Huntingdon, PA (US); Michael L. Ryneson, Pittsburgh, PA (US)

(73) Assignee: Extrude Hone Corporation, Pittsburgh, PA (US)

( * ) Notice: Subject to any disclaimer, the term of this patent is extended or adjusted under 35 U.S.C. 154(b) by 33 days.

(21) Appl. No.: 10/194,409

(22) Filed: Jul. 12, 2002

(65) Prior Publication Data

US 2004/0009089 A1 Jan. 15, 2004

(51) Int. Cl.$^7$ .................................................. B22F 3/00
(52) U.S. Cl. ............................................................ 75/228
(58) Field of Search ........................................... 75/228

(56) References Cited

U.S. PATENT DOCUMENTS

| | | | |
|---|---|---|---|
| 4,130,422 A | * 12/1978 | Wang et al. | 75/246 |
| 4,608,317 A | 8/1986 | Kobayashi et al. | |
| 5,076,869 A | * 12/1991 | Bourell et al. | 264/497 |
| 5,328,657 A | * 7/1994 | Kamel et al. | 419/36 |
| 5,872,322 A | * 2/1999 | Mocarski et al. | 75/246 |
| 5,950,063 A | * 9/1999 | Hens et al. | 419/5 |
| 6,399,018 B1 | * 6/2002 | German et al. | 419/2 |
| 6,630,009 B2 | * 10/2003 | Moussa et al. | 75/255 |

FOREIGN PATENT DOCUMENTS

| | | |
|---|---|---|
| WO | WO 96 09132 A | 3/1996 |
| WO | WO 98 52709 A | 11/1998 |

OTHER PUBLICATIONS

PCT International Search Report for PCT/US/32220; Issued Jun. 16, 2003.
PCT International Examination Report for PCT/US 02/322220; issued Oct. 29, 2003.

* cited by examiner

Primary Examiner—Ngoclan T. Mai
(74) Attorney, Agent, or Firm—Thomas Lizzi

(57) ABSTRACT

A green article comprising an A-B powder mixture and methods of manufacturing such green articles and corresponding sintered articles are disclosed. The A-B powder mixture consists of a minor volume fraction of a relatively fine powder A and a complementary major volume fraction of a relatively coarse prealloyed powder B wherein the A-B powder mean particle size ratio is at least about 1:5. Metal powder A consists of one or more elemental metals or alloys which has a melting or solidus temperature above the highest sintering temperature at which the A-B powder mixture may be sintered without slumping. Prealloyed metal powder B consists of one or more alloys which are amenable to supersolidus liquid phase sintering. Green articles made from the A-B powder have a wider sintering temperature window than do articles made from prealloyed metal powder B alone.

6 Claims, 2 Drawing Sheets

BLENDED POWDER SOLID-SUPERSOLIDUS LIQUID PHASE SINTERING

STATEMENT AS TO RIGHTS TO INVENTION MADE UNDER FEDERALLY-SPONSORED RESEARCH AND DEVELOPMENT

The U.S. Government has a paid-up license in this invention and the right in limited circumstances to require the patent owner to license others on reasonable terms as provided for by the terms of Contract No. N00014-00-C-0378 awarded by the Office of Naval Research.

BACKGROUND OF THE INVENTION

1. Field of the Invention

The present invention relates to the field of powder metallurgy. More particularly, the present invention relates to methods which involve blending a relatively fine metal powder with a relatively coarse prealloyed metal powder to produce a mixture that has a widened sintering temperature window compared to that of the relatively coarse prealloyed metal powder. The present invention also relates to articles made from such powder mixtures.

2. Description of the Related Art

The science and industry of making and using powder metals is referred to as powder metallurgy. Powder metal compositions include elemental metals as well as metal alloys and compounds. A wide variety of processes are used to make powder metals, for example, chemical or electrolytic precipitation, partial vaporization of metal containing compounds, and the solidification of liquid metal droplets atomized from molten metal streams. The shapes of metal powder particles are influenced by the powder making method and range from spherical to irregular shapes. Powder metals particles range in size from submicron to hundreds of microns. Particle size is measured as a diameter for spherical powders or as an effective diameter for non-spherical powders.

Various techniques are employed to consolidate powder metals particles to form useful metal articles through the use of applied pressure and/or elevated temperatures. The powder metal to be consolidated is typically formed into a shape at room temperature and held in place through the use at least one restraining mechanism such as container walls, a fugitive binder material, or mechanical interlocking caused by pressing the powder metal particles together with high pressure in a die press. Examples of specific forming processes include powder containerization, solid free-forming layer-wise buildup techniques (for example, three-dimensional printing (3DP) and selective laser sintering (SLS)), metal injection molding (MIM), and metal powder die pressing. The term "green article" is used herein to refer to the shaped powder metal article produced by this stage of the consolidation process. The green article is then heated to one or more elevated temperatures at which atomic diffusion and surface tension mechanisms become active to consolidate the powder metal by sintering. The term "sintered article" is used herein to refer to the consolidated powder metal article produced by this stage of the consolidation process. Although sintering may occur to some extent over a range of temperatures as the green article is being heated, the peak temperature to which the green article is heated is what is usually referred to as the "sintering temperature." Generally, the green article is held for a period of time ranging from a few minutes to a few hours at the sintering temperature, the length of time depending upon a variety of process and metallurgical system-related factors.

The heating of the green article is done in a controlled atmosphere or vacuum so as to protect the powder metal from undesired reactions with atmospheric constituents. The heating is also controlled so as to eliminate any fugitive binders from the green article. The consolidation of the green article into a sintered article is typically done at about atmospheric pressure or under vacuum. Some specialized techniques, however, such as hot isostatic pressing, hot uniaxial pressing, and hot extrusion, apply a pressure to the green article while it is hot to aid in the consolidation. In some processes, for example, in some embodiments of 3DP and SLS, consolidation is achieved through an infiltration process by wicking a liquid metal into the pores of the green article from a source external to the green article.

As the consolidation of the powder metal proceeds from green article to sintered article, the density of the article increases as some or all of its porosity is eliminated. Density, in this application, may be defined as "absolute density," which is the article's mass per unit volume. Absolute density is expressed in terms such as grams per cubic centimeter. Density is also defined as "relative density," which is the ratio of the absolute density of a powder metal article to the density which that article would have if it contained no porosity. Relative density is expressed in terms of a percentage, with a highly porous article having a low relative density and an article having no porosity having a relative density of 100%. The relative density of a green article depends on many factors and is sensitive to the method by which the green article was formed. Green article densities are generally in the range of about 50–90%. The relative densities of sintered articles also depend on a variety of factors, including parameters of the sintering process. The sintered article relative densities typically are in the range of 75–95%. For applications in which the mechanical strength of a sintered article is of importance, high relative densities are generally desired. The increase in the relative density from the green article stage to the sintered article stage is referred to herein as "densification."

Densification may proceed by "solid state sintering," which is a term that describes the phenomena by which solid particles become joined together at contact points through the diffusion of atoms between the contacting particles. The number of point contacts for a given volume of powder and the ratio of surface area to particle volume increase as metal powder particle size decreases, which results in finer powder metals solid state sintering more readily and at lower temperatures than do larger powder metal particles.

Densification of a green article during sintering can be enhanced by the presence of a liquid phase within the green article. The enhancement occurs because of the relatively high atomic diffusion rates through a liquid as compared to a solid and because of the effect that the surface tension of the liquid has in drawing the solid particles together. The sintering that results from the presence of the liquid phase is identified as "liquid phase sintering." In some powder metallurgical systems, the powder metal in the green article comprises a minor volume fraction of a relatively low temperature melting powder metal and a high volume fraction of a second type of powder metal which remains solid at the sintering temperature. For example, a tungsten carbide-cobalt green article may contain a low volume fraction cobalt powder, which is liquid at the sintering temperature, and a high volume fraction tungsten carbide powder, which remains solid at the sintering temperature.

An important variant of liquid phase sintering is supersolidus liquid phase sintering. Supersolidus liquid phase sintering is possible if a prealloyed powder metal passes into a solid-plus-liquid phase state upon heating. Referring to FIG. 1, which depicts a portion of an idealized temperature-composition equilibrium phase diagram 1 for an alloy system consisting of metal Y and metal Z, the horizontal axis 2 relates to composition with the left hand end 4 of horizontal axis 2 representing pure metal Y. The weight percentage of metal Z in the alloy composition increases linearly to the right along the horizontal axis 2. The vertical axis 6 relates to temperature, which increases in the upward direction. The phase diagram 1 contains two phase boundary lines, liquidus line 8 and solidus line 10, which divide the illustrated portion of phase diagram 1 into three phase regions: a liquid phase region 12 above liquidus line 8; a solid-plus-liquid phase region 14 between liquidus line 8 and solidus line 10; and a solid phase region 16 below solidus line 10. A pure metal, such as metal Y, upon heating from a temperature at which it is a solid, remains a solid until it reaches its melting point temperature, $T_m$ 18, at which it melts, and is a liquid at temperatures above $T_m$ 18. In contrast, a Y-Z alloy of composition X 20, upon heating from the solid phase region 16 along dotted line 22 remains completely solid only until it crosses the solidus line 10 at its solidus temperature $T_s$ 24 and enters the solid-plus-liquid phase region 14. In this region, the alloy exists in part as a solid and in part as a liquid. Upon further heating, the solid fraction decreases and the liquid fraction increases until the temperature crosses the liquidus line 8 at the alloy's liquidus temperature $T_l$ 26 into liquid phase region 12, wherein the alloy exists as all liquid. Upon cooling, the process is reversed, with the liquid transforming upon crossing the liquidus line 8 into a liquid-plus-solid slush with an ever decreasing amount of liquid until the solidus line 10 is crossed and the alloy once again becomes all solid.

"Supersolidus liquid phase sintering," as used herein, refers to liquid phase sintering that occurs at a temperature that is between the solidus temperatures and the liquidus temperature of the particular alloy composition. Supersolidus liquid phase sintering takes advantage of the two phase, solid-plus-liquid phase region 14 as a means of providing a liquid phase for liquid phase sintering. For example, if supersolidus liquid phase sintering is done at temperature $T_S$ 28, a Y-Z alloy of composition X 20 is in the solid-plus-liquid phase region 14 and consists partly of a solid of composition $X_s$ 30 and partly of a liquid of composition $X_l$ 32. The fraction of liquid present is equal to the length of the sintering temperature dotted line 34 that is between its intersection point 38 with the solidus line 10 and its intersection point 36 with the composition X dotted line 22 divided by the length of the sintering temperature dotted line 34 that is between its intersection point 38 with the solidus line 10 and its intersection point 40 with the liquidus line 8. A prealloyed metal powder is amenable to supersolidus liquid phase sintering if a sintering temperature exists for the prealloyed metal powder at which the prealloyed metal powder densifies by supersolidus liquid phase sintering without slumping. Slumping refers to a noticeable amount of gravity-induced distortion of a green article occurring during liquid phase sintering that causes the dimensions of the resulting sintered article to be outside of their respective dimensional tolerance ranges. However, in micro-gravity conditions, slumping refers to such distortions which are surface tension-induced, rather than gravity-induced.

The supersolidus liquid phase sintering of a powder metal is shown diagramatically in FIGS. 2A–C. Referring to FIG. 2A, a small portion 42 of a green article is shown at great magnification before heating. Small portion 42 includes powder metal particles 44 of a Y-Z alloy corresponding to the composition X 20 discussed above. It also includes a pore 46, which is indicated by the hatch area between the powder metal particles 44. Powder metal particles 44 each contain grains 48.

Referring to FIG. 2B, the temperature of the small portion 42 of the green article has been raised to sintering temperature $T_S$ 28 within the solid-plus-liquid phase region 14 of the phase diagram 1 that is shown in FIG. 1. A liquid phase 50 has formed between and around the grains 48 of the powder metal particles 44. The liquid phase 50 has begun drawing the powder metal particles 44 closer together, shrinking pore 46. Comparison with FIG. 2A shows that the grains 48 have changed shape as the liquid 50 forms and dissolution and reprecipitation processes occur.

Referring to FIG. 2C, the temperature of the small portion 42 of the green article is still at sintering temperature $T_S$ 28, but sufficient time has elapsed for the supersolidus liquid phase sintering to have progressed to the point where the pore 46 has been eliminated. Some of the grains 48 have become rearranged and changed in size and shape from their initial state. Although the amount of liquid phase 50 is the same as it was in FIG. 2B, it too has become redistributed. As a result of the sintering, the green article has densified.

The volume fraction of liquid phase that is present during any type of liquid phase sintering, including supersolidus liquid phase sintering, is very important. An insufficient amount of liquid phase may be ineffective in achieving the desired level of densification. Alternatively, an excess of liquid phase may result in slumping of the article. During liquid phase sintering, when most or all of the remaining solid grains or powder particles are surrounded by a liquid phase, the shape of the green article is maintained by surface tension forces which give a high viscosity to the liquid-solid combination. When the volume fraction of liquid phase is below a threshold level, this viscosity is sufficiently high to permit the sintering green article to retain its shape at the sintering temperature long enough for the densification to occur to a desired point. Above the threshold level, gravity-induced distortion exceeds a tolerable level before the desired level of densification is achieved. The maximum amount of liquid phase that can be tolerated during liquid phase sintering varies complexly and widely and must be determined empirically.

Maintaining the article at the sintering temperature too long will also result in slumping as gravity-induced viscous flow proceeds at a slow, but definite rate, even when the amount of liquid present at the sintering temperature is such that the viscosity is high. Additionally, time-related slumping may occur as coarsening of the solid phase grains or particles causes a net decrease in their surface area that is in contact with the liquid and a corresponding increase in the thickness of the liquid layer between the grains, thereby decreasing viscosity.

Supersolidus liquid phase sintering is substantially affected by the rate of change of the volume fraction of liquid phase with respect to temperature near the sintering temperature for a particular alloy. If the volume of liquid phase increases rapidly with temperatures, the alloy is considered to be very sensitive to the sintering temperature. In some cases, the furnace temperature deviation about a set-point temperature, which in industrial furnaces can be on the order of tens of degrees Celsius, can exceed the temperature range in which a proper range of liquid phase fraction amounts are present in the alloy. A temperature deviation to the low end of the temperature furnace temperature deviation range could produce insufficient densification whereas a deviation to the high end of the temperature range could result in slumping. High precision temperature control usually comes at the cost of lower through-put capacities and higher equipment prices.

Additionally, temperatures may vary from location to location within the working zone a furnace. Among the relevant factors are a location's proximity to heating elements, load and fixture related shielding from radiative heating sources, and variations in gas flow patterns. Temperature variations during processing also occur within a green article as the outside of the article heats up before its interior. Such intra-article temperature variations are affected by the rate at which the furnace temperature is ramped up to the sintering temperature. For example, rapid ramping rates may cause large temperature differences between the outside and inside of a green article, whereas more moderate ramping rates allow time for better temperature equalization within the green article.

Any of the aforementioned process-related temperature variation factors may make it difficult or impracticable to sinter a particular green article. In some cases, although supersolidus liquid phase sintering of a particular green article is practicable, the processing-related temperature variations make it necessary to use a lower sintering temperature within the solidus/liquidus temperature range and require a correspondingly longer sintering time, in order to avoid slumping. This also has the disadvantageous effect of lowering the throughput capacity of the furnace.

What is needed in the art is a process that will widen the window of sintering temperatures within which a green article can be sintered to an acceptable density. Widening the sintering temperature window would make the sintering of the green article less sensitive to process-related temperature variations. This could translate into the ability to sinter the green articles in less expensive furnaces and at higher throughput rates.

SUMMARY OF THE INVENTION

The inventors have discovered that a green article comprising an A-B powder mixture may be sintered without slumping over a widened temperature range. Such an A-B powder mixture is made by mixing a minor volume fraction of a relatively fine metal powder A, which has a melting or solidus temperature that effectively exceeds the sintering temperature at which the powder mixture containing that powder is sintered, with a complementary major volume fraction of a relatively coarse prealloyed metal powder B, which is an alloy amenable to supersolidus liquid phase sintering. A green article comprising the A-B powder mixture may be sintered without slumping into a solid article at a sintering temperature that is within a wider temperature range than can a corresponding article which does not contain a volume fraction of the relatively fine metal powder A. "Relatively fine" and "relatively coarse" signify that the mean particle sizes of the selected metal powders A and B are related by a ratio of about 1:5 or higher, that is, that the mean particle size of metal powder B is at least about 5 times larger than the mean particle size of metal powder A. Metal powders A and B may be of any shape.

The term "volume fraction" for a given powder refers to the portion of the occupied volume of a powder mixture which is actually occupied by that particular powder. For example, in a powder mixture having a 100 cc occupied volume of which 30 cc is occupied by powder A and 70 cc is occupied by powder B, the volume fraction of powder A is 30% and the volume fraction of powder B is 70%. The volume of any fugitive or reactive additives that may be added to a powder mixture of identified components is not considered in determining the volume fraction of the identified components. Thus, an addition of 5 cc of a fugitive additive, such as a polymer binder, or of a reactive additive, such as carbon, to an A-B powder mixture consisting of 30 cc of powder A and 70 cc of powder B does not influence the determination that the volume fraction of powder A in the mixture is 30% and the volume fraction of powder B is 70%.

A green article "can be sintered without slumping" if no slumping occurs when the green article is sintered to an achievable desired relative density in a reasonable time. Prolonged exposure to sintering temperatures for unreasonably long times can cause slumping due to time-related effects. Also, those skilled in the art will recognize that there is a limit to the relative density that is achievable by sintering that places an upper limit on the relative density that can reasonably be achieved.

Green articles made from such A-B metal powder mixtures undergo substantial densification to a given relative density at lower sintering temperatures than do corresponding green articles of relatively coarse prealloyed metal powder B which do not contain a volume fraction of the relatively fine metal powder A. Moreover, green articles of such powder mixtures may be sintered at measurably higher temperatures within the solidus/liquidus temperature range of relatively coarse prealloyed metal powder B without slumping than can corresponding green articles of relatively coarse prealloyed metal powder B that do not contain a volume fraction of the relatively fine metal powder A. Thus, the sintering temperature window or range of a green article is effectively widened, thus making it less susceptible to the deleterious effects of temperature variations experienced in processing furnaces.

The relatively fine metal powder A particles occupy the interstices between the relatively coarse prealloyed metal powder B particles in a green article which comprises such an A-B powder mixture. Such particle packing in the powder mixture increases the relative density of the green article. The relatively coarse prealloyed metal powder B is difficult to sinter in the solid state, whereas the relatively fine metal powder A densifies relatively readily by solid state sintering. The benefit of using the fine powders is that, upon heating, solid state sintering of the relatively fine metal powder A densifies the green article to a higher density at a lower temperature in comparison to a corresponding green article of only the relatively coarse prealloyed metal powder B. Further increasing the sintering temperature above the solidus temperature, but below the liquidus temperature, of the relatively coarse prealloyed metal powder B softens the relatively coarse prealloyed metal powder B particles via a liquid phase that forms within those particles, penetrating their grain boundaries. The liquid phase formation also causes the fast densification that is typical of supersolidus liquid phase sintering. The combination of the solid state sintering contributions of the relatively fine metal powder A and the supersolidus liquid phase sintering contributions of the relatively coarse prealloyed metal powder B results in the blended powder mixture sintering by what may be defined as solid-supersolidus liquid phase sintering. Moreover, the volume fraction of relatively fine metal powder A dimensionally stabilizes the green article during this solid-supersolidus liquid phase sintering such that higher sintering temperatures can be employed without slumping in comparison to a corresponding green article of only relatively coarse prealloyed metal powder B.

It is to be understood that the present invention is not limited to methods and green articles comprising bimodal powder distributions. Higher-level poly-modal powder distributions are also contemplated, for example, trimodal distributions. Such distributions contain a major volume fraction of a relatively coarse prealloyed metal powder B, which is amenable to supersolidus liquid phase sintering, and a complementary minor volume fraction of relatively fine metal A consisting of sub-fractions such as sub-fractions $A_1$, $A_2$ and $A_3$. Each of the relatively fine metal powder sub-fractions $A_1$, $A_2$, and $A_3$ has a melting temperature or solidus temperature that exceeds the maximum sintering temperature at which the A-B powder mixture may be sintered without slumping. The mean particle sizes of metal powders $A_1$ and B are related by a ratio of about 1:5 or higher and the mean particle sizes of each successive pair-wise combinations of relatively fine metal powders, for example, $A_1$ and $A_2$, $A_2$ and $A_3$, are related by a ratio of about 1:5 or higher. These size ratios allow the finer powders to nest within the interstices of the coarser powders.

It is also to be understood that in all cases, the relatively fine metal powder A must remain essentially solid at the sintering temperature. "Essentially solid" identifies that, on the average, the relatively fine metal powder A particles must retain sufficient structural integrity and physical size at the sintering temperature to act as physical barriers to the movement of the relatively coarse prealloyed metal powder B particles or grains thereof. Thus, some dissolution of metal powder A particles at or below the sintering temperature is permissible, as is the formation of a small amount of internal liquid within metal powder A particles. It is also permissible for the metal powder A particles to react with the metal powder B particles, even to form a small amount of liquid, so long as the structural integrity and size criteria are met. In embodiments using higher-level poly-modal distributions, each of the relatively fine metal powder sub-fractions must be essentially solid at the sintering temperature.

It is also to be understood that the relatively fine metal powder A may consist one or more elemental metals or alloys. For example, the powder volume fraction identified as relatively fine metal powder A may be made up a first volume sub-fraction of metal C and a second volume sub-fraction of metal D. In embodiments where higher-level poly-modal distributions are employed, each of the relatively fine metal powders sub-fractions, for example $A_1$, $A_2$ and $A_3$, may consist of one or more elemental metals or alloys which may be the same or different from those in the other volume sub-fractions. The relatively coarse prealloyed powder B may also consist of one or more alloys.

Green articles comprising a powder metal mixture having a minor volume fraction of a relatively fine metal powder A and a complementary major volume fraction of a relatively coarse prealloyed metal powder B are also contemplated. In these embodiments, the relatively fine metal powder A is an elemental metal or alloy whose melting temperature or solidus temperature is higher than the highest sintering temperature at which the A-B powder mixture can be sintered without slumping and the coarse prealloyed metal powder B is an alloy that is amenable to supersolidus liquid phase sintering.

Methods of producing a green article having an enhanced sintering temperature range are also contemplated. Such a method includes the steps of mixing together a minor volume fraction of a relatively fine metal powder A and complementary major volume fraction of a relatively coarse prealloyed metal powder B to produce an A-B metal powder mixture, and forming a green article from said A-B metal powder mixture, wherein the relatively fine metal powder A is a metal or alloy whose melting temperature or solidus temperature is higher than the highest sintering temperature at which the A-B powder mixture can be sintered without slumping, and wherein the coarse prealloyed metal powder B is an alloy that is amenable to supersolidus liquid phase sintering.

Methods of densifying a green article are also contemplated. Such a method includes the steps of mixing together a minor volume fraction of a relatively fine metal powder A and complementary major volume fraction of a relatively coarse prealloyed powder B to produce an A-B metal powder mixture, forming a green article from said A-B metal powder mixture, and heating the green article to a sintering temperature below the liquidus temperature of the relatively coarse prealloyed metal powder B to densify the green article by sintering, wherein the relatively fine metal powder A is an elemental metal or alloy whose melting temperature or solidus temperature is higher than the highest sintering temperature at which the A-B powder mixture can be sintered without slumping, and wherein the relatively coarse prealloyed metal powder B is a metal alloy that is amenable to supersolidus liquid phase sintering. Where the relatively coarse prealloyed metal powder B consists of more than one alloy, the sintering temperature is a temperature that is lower than the liquidus temperature of each of the various relatively coarse prealloyed metal powder B alloys. In this method, the sintering temperature may, but need not, exceed the solidus temperature of the relatively coarse prealloyed metal powder B, or, where the relatively coarse prealloyed metal powder B consists of more than one alloy, the sintering temperature may, but need not, exceed the solidus temperature of any of those alloys.

Also contemplated are methods of solid-supersolidus liquid phase sintering a green article. Such a method comprises the steps of mixing together a minor volume fraction of a relatively fine metal powder A and a complementary major volume fraction of a relatively coarse prealloyed powder B to produce an A-B metal powder mixture, forming a green article from said A-B metal powder mixture, and heating the green article to a sintering temperature between the solidus and liquidus temperatures of the relatively coarse prealloyed metal powder B, wherein the relatively fine metal powder A is a metal or alloy whose melting temperature or solidus temperature is higher than the sintering temperature at which the A-B powder mixture can be sintered without slumping, and wherein the coarse prealloyed metal powder B is an alloy that is amenable to supersolidus liquid phase sintering. Where the coarse prealloyed metal powder B consists of more than one alloy, the sintering temperature is a temperature that exceeds the solidus temperature of each of the various relatively coarse prealloyed metal powder B alloys and is lower than the liquidus temperature of each of the various relatively coarse prealloyed metal powder B alloys.

It is to be specifically understood that embodiments related to corresponding green articles and methods involving higher-level poly-modal powder distributions are also contemplated.

Other features and advantages inherent in the subject matter disclosed and claimed will become apparent to those skilled in the art from the following detailed description of presently preferred embodiments thereof and to the appended drawings.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

FIG. 2A is a diagramatic drawing showing the small portion prior to heating.

FIG. 2B is a diagramatic drawing showing the small portion illustrated in FIG. 2A upon heating to a sintering temperature $T_S$ that is between the solidus and liquidus temperatures of composition X.

FIG. 2C is a diagramatic drawing showing the small portion illustrated in FIG. 2B at sintering temperature $T_S$ after sufficient time has elapsed to eliminate the pore that was between the powder particles.

FIG. 3A is a diagramatic drawing showing the small portion prior to heating.

FIG. 3B is a diagramatic drawing of the small portion illustrated in FIG. 3A at solid-supersolidus liquid phase sintering temperature $T_{SS}$ after the elapse of sufficient time for densification by solid-supersolidus liquid phase sintering to have occurred.

DETAILED DESCRIPTION OF PREFERRED EMBODIMENTS

Figure 1:
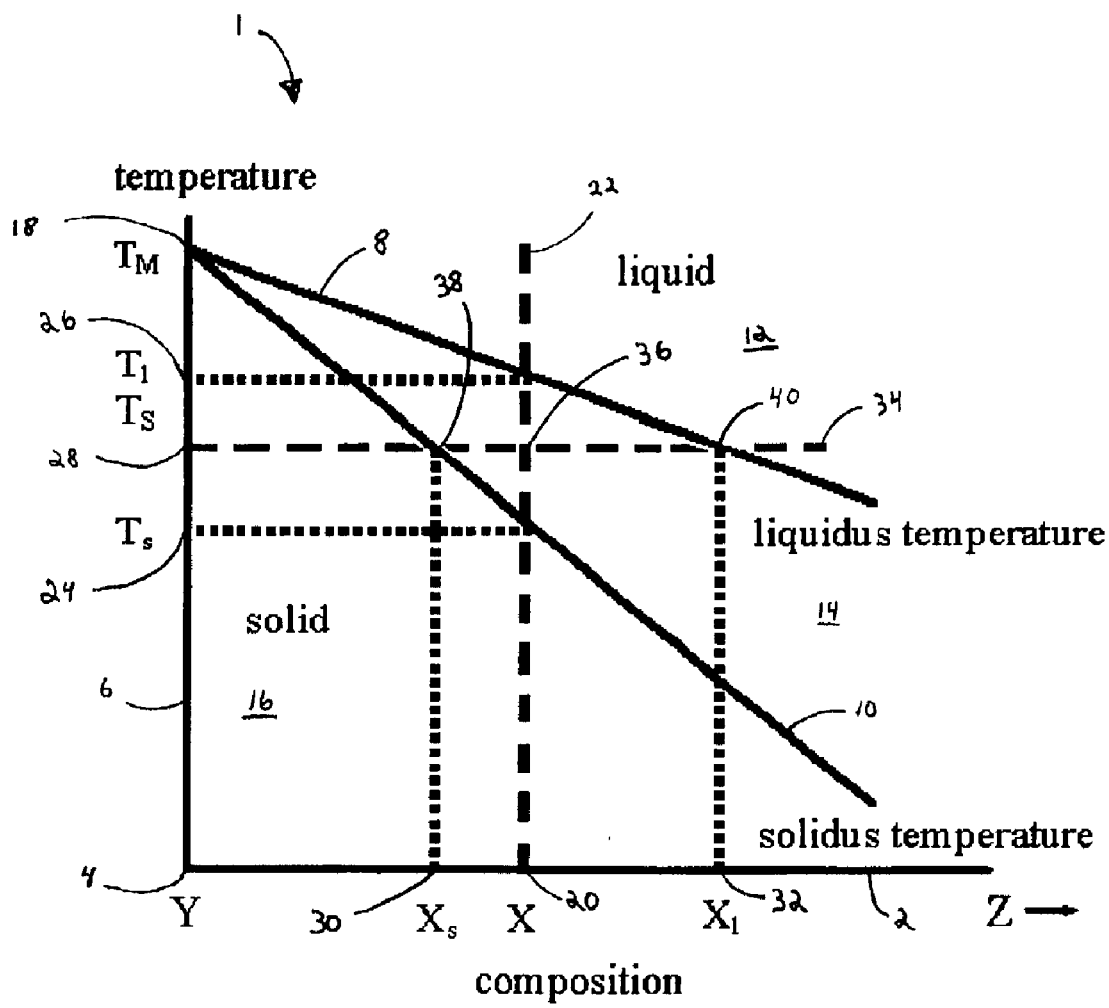
FIG. 1 is a portion of an idealized temperature-composition equilibrium phase diagram for a binary metal system Y-Z.

In this section, some presently preferred embodiments of the present invention are described in detail sufficient for one skilled in the art to practice the present invention.

The metal powders used in the embodiments may be of any shape. However, the discussion is generally presented in terms of spherical powders, because spherical powders are easy to visualize and discuss. Also to simplify the discussion, the terms "relatively fine metal powder A" and "relatively coarse prealloyed powder B" are shortened to "fine powder A" and "coarse powder B," respectively, and sometimes just "powder A" and "powder B", respectively, except where the expression of the full term aids in clarity.

The most basic powder mixtures in these embodiments consist of a minor volume fraction of a relatively fine metal powder A and a complementary major volume fraction of a relatively coarse prealloyed metal powder B. These volume fractions may be adjusted to produce a mixture that has a relative density and a flowability which are optimized for the forming operation in which the A-B powder mixture will be used to make a green article. The highest relative density is achieved when the volume fraction of fine powder A is adjusted so that the interstices between the coarse powder B particles are filled with fine powder A particles. However, fine powders do not flow as well as coarse powders. Thus, in operations where high flowability is important, for example, in 3DP and SLS, it is preferred that the volume fraction of the fine powder A be below the level that would give the highest relative density. In other operations wherein flowability is not as critical, for example, in the die pressing of simple shapes, the volume fractions may be adjusted to give the powder mixture that is close to or at the highest relative density.

Although powders of any size may be used in the embodiments contemplated herein, in practice, it is very difficult to densify green articles having mean particle sizes over 160 microns. Also, because fine powders have poor flowability and the selection of the mean particle size of the relatively fine metal powder A is to be related to mean particle size of the relatively coarse prealloyed metal powder B, it is preferred that the lower limit of the mean particle size of the relatively coarse prealloyed metal powder B be about 30 microns. More preferably, to provide for good sinterability and flowability, the mean particle size of the powder B should be in the range of 45 to 60 microns. The particle size may be measured by any conventional method from which a mean particle size can be obtained, for example, laser diffractometry.

The mean particle size of the relatively fine metal powder A is dependent on the mean size of the metal powder B used. The ratio of the mean particle size of fine powder A to that of the coarse powder B is to be at least about 1:5 to provide for good filling of the interstices between the coarse powder B particles with fine powder A particles. More preferably, the ratio is at least 1:7. Thus, when the mean diameter of the coarse powder B is 30 microns, the mean particle size of the fine powder A is no more than about 6 microns and is preferably less than about 4 microns. When the mean particle size of the coarse powder B is 160 microns, the mean particle size of the fine powder A is no more than about 32 microns, and preferably less than about 23 microns. When the mean particle size of the coarse powder B is 45 microns, the mean particle size of the fine powder A is no more than about 9 microns and preferably less than about 7 microns. Likewise, when the mean particle size of the coarse powder B is 60 microns, the mean particle size of the fine powder A is no more than about 12 microns and preferably less than about 8 microns.

In more complex powder mixtures, a higher than binary poly-modal powder distribution may be used. Such mixtures comprise a major volume fraction of a coarse powder B and a complementary minor volume fraction of relatively fine powder A consisting of two or more successively finer sub-fractions, for example sub-fractions $A_1$, $A_2$, and $A_3$. The coarse powder B has the same characteristics that the coarse powder B has with regard the simple binary distribution mixtures. Each of the fine powder sub-fractions has the same characteristics that fine powder A has with regard to simple binary distribution mixtures, except for the mean particle size ratio relationship with powder B for all but the largest of the sub-fractions. In the case of higher-level poly-modal mixtures, the mean particle size of fine metal powder $A_1$ is related to that of the coarse powder B by a ratio of at least 1:5 and more preferably at least 1:7. The mean particle sizes of each successive pair-wise combination of $A_1$ to $A_2$, $A_2$ to $A_3$, and so on, are related by a ratio of at least 1:5 and more preferably at least 1:7. For example, for a trimodal powder distribution wherein powder B has a mean particle size of 49 microns, and a 1:7 mean particle size ratio exists between powder B and sub-fraction powder $A_1$ as well as between sub-fraction powders $A_1$ and $A_2$, the mean particle sizes of powders $A_1$ and $A_2$ are, respectively, 7 and 1 microns.

With regard to powder composition, the volume fraction of the powder mixture identified as the relatively fine powder A may be comprised of one or more elemental metals or alloys. Examples of elemental metals include iron, copper, and nickel. Examples of alloys include steels, stainless steels, nickel-based alloys, and copper-based alloys. Each of the elemental or alloys comprising powder A must be essentially solid at the sintering temperature used for sintering the green article formed from the A-B powder mixture. In embodiments in which higher-level poly-modal distributions are employed, each of the sub-fractions may be comprised of one or more such elemental metals or alloys and the same elemental metal or alloy may be in more than one sub-fraction.

The coarse powder B volume fraction, whether in A-B powder mixtures having bimodal or higher-level poly-modal distributions, may comprise one or more alloys. Each of the alloys comprising powder B must be an alloy which is amenable to supersolidus liquid phase sintering. Examples of such alloys include Inconel 625, Stellite, Haynes Alloy 613, and Tribaloy T-800.

Fugitive or reactive additives may be added to the powder mixtures, either before or while the powder mixture is being formed into a green article. The volumes of such additives are not taken into account in the determination of the volume fractions of the fine powder A and the coarse powder B. Examples of fugitive additives include polymer binders and lubricants such as wax, stearate, rubber, cellulose, and acrylics. Examples of reactive additives include carbon powder, boron powder, and other additives that are made in amounts of under 1 weight percent to adjust the composition of one or more of the components of the powder mixture during the consolidation process.

The powder mixtures may be prepared by conventional mixing or blending techniques, for example, by tumbling the fine powder A with the coarse powder B in a V-blender or a double-cone blender. Preferably, the fine powder A and the coarse powder B are mixed or blended until a homogenous mixture is obtained. Localized distortion in the sintered article may result from over- or under-mixing. The powder mixture may also be prepared as a slurry by the incorporation of a volatile liquid, for example, acetone or ethyl alcohol, either during or after the initial mixing of the A and B powders. Such a volatile liquid may be removed by evaporation either prior to or during the process of forming a green article from the powder mixture.

Green articles may be prepared from the A-B powder mixtures by powder containerization, solid free-forming layer-wise buildup techniques, metal injection molding, or die pressing, using conventional procedures. Such green articles may be of any shape conventionally produced by such forming processes ranging from very simple to very complex geometries. The preferable solid free-forming layer-wise buildup techniques that can be used are 3DP and SLS.

The green articles may be sintered in any type of conventional sintering furnace using conventional heating rates and atmospheres. Where the green article contains a fugitive binder, conventional de-binding conditions may be used to eliminate the fugitive binder.

The actual conditions to be used for heating and sintering the green articles is case-dependent, as required by the particular powder compositions in the powder mixture and the powder fractions used for the fine powder A and the coarse powder B. Also relevant are factors peculiar to the green article such as binder content and type, relative density, density gradients, size and geometrical complexity, as well as the sintered relative density that it is desired for the sintered article. "Sintered relative density" refers to the relative density of the sintered article. One skilled in the art will recognize that some experimentation is required to determine the optimum heating and sintering conditions for any particular green article.

Sintering of the green articles may be done either above or below the solidus temperature of the coarse powder B depending on the desired sintered relative density. In general, sintering below the solidus temperature yields markedly lower sintered relative densities. Nonetheless, where the sintering temperature is below the powder B solidus temperature, the presence of the fine powder A in the green article causes the green article to densify by solid state sintering to a higher sintered relative density than is achievable without the powder A fraction being present. Thus, the present invention reduces the low temperature end of the sintering window for the green article.

Figure 2A:
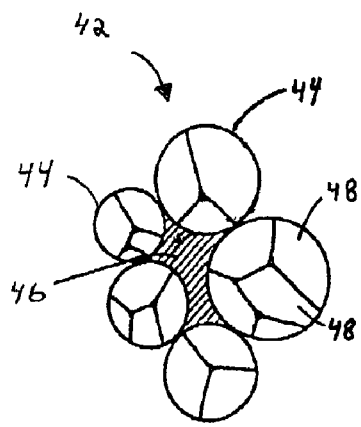
FIGS. 2A–C is a set of diagramatic drawings showing, at great magnification, the progressive densification of a small portion of a prior art green article of a powder metal alloy of composition X during a prior art conventional supersolidus liquid phase sintering process.
Figure 2B:
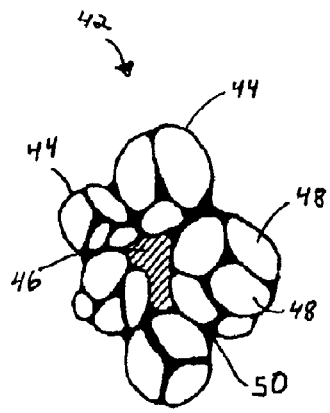
Figure 2C:
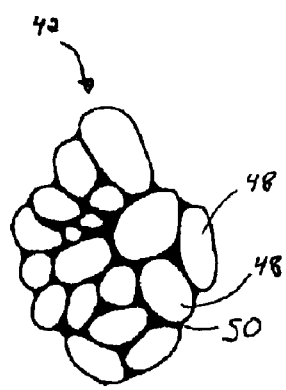
Figure 3A:
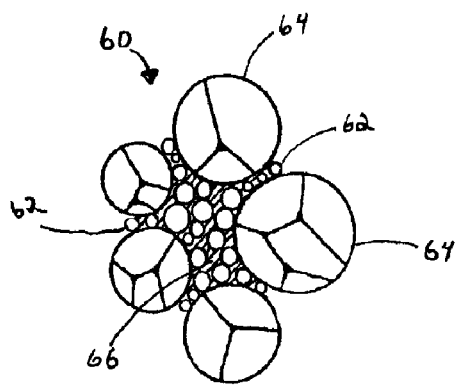
FIGS. 3A–B is a set of diagramatic drawings showing, at great magnification, the progressive densification of a small portion of a green article embodiment of the present invention undergoing solid-supersolidus liquid phase sintering wherein the coarse powder B fraction of the green article is an alloy of composition X.
Figure 3B:
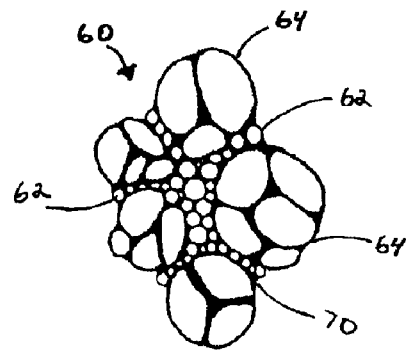

The green article may be sintered by solid-supersolidus liquid phase sintering. Referring to FIGS. 3A and 3B, the solid-supersolidus liquid phase sintering depicted there proceeds somewhat differently for green article embodiments than it does for the case depicted in FIGS. 2A–C. Referring to FIG. 3A, a small portion 60 of a green article embodiment is shown at great magnification before heating. Small section 60 includes fine powder A particles 62 and coarse powder B particles 64. Interparticle porosity 66 is indicated by the hatching in the areas between fine powder particles 62 and the coarse powder particles 64. Coarse powder B particles 64 are shown to each contain grains 68.

Referring to FIG. 3B, the temperature of small portion 60 of the green article has been raised to the solid-supersolidus liquid phase sintering temperature $T_{SS}$ and held there for sufficient time for densification to occur by solid-supersolidus liquid phase sintering. Liquid phase 70 has formed from the partial melting of the coarse powder B particles 64 and has wicked into the interparticle areas and has drawn the coarse powder B particles 64 closer together. Although all porosity that is in the green article is not necessarily eliminated, the porosity 66 has been eliminated from the small portion 60 and the green article has densified. The presence of the fine powder particles 62 in the interstices between the coarse powder B particles 64, however, has interfered with the movement of the coarse powder B particle grains 68, thus stabilizing the overall structure of the green article and retarding the gravity-induced viscous flow that produces slumping, even though $T_{SS}$ may be above the $T_S$ used in the case that is shown in FIG. 2C.

Coarse powder B may comprise more than one alloy. In such cases, the green article may be densified by solid sintering alone by maintaining the sintering temperature below the lowest solidus temperature of the powder B component alloys. Solid-supersolidus liquid phase sintering may be done at a temperature that is above the lowest solidus temperature of the powder B component alloys and below the lowest liquidus temperature of the powder B component alloys. More preferably, the solid-supersolidus liquid phase sintering is performed at a temperature that is within the solidus/liquidus temperature range of each of the powder B component alloys so that each such alloy contributes liquid for the densification of the green article.

The fine powder A also may comprise more than one metal or alloy. Each powder A constituent metal or alloy is essentially solid at the sintering temperature.

Following sintering, the sintered article may be subjected to additional processing by conventional methods. For example, the sintered article may be hot isostatically pressed to achieve further densification.

EXAMPLES

The following non-limiting examples are given for further illustration of the present invention, but are not intended to limit its scope at all.

Example 1

A-B powder mixtures were prepared using pure copper powder (vendor grade designation, 2000; 99.0% purity) as the relatively fine metal powder A and a bronze alloy (vendor grade designation, 40P) as the relatively coarse powder B. The composition of the bronze alloy was, in weight percent: 9.23% tin, 0.0496% phosphorus, balance copper. The copper and the bronze powders were spherical powders obtained from AcuPowder International, LLC, of Union, N.J., U.S. The copper powder had a mean particle size of about 5 microns and the bronze powder had a mean particle size of about 118 microns as measured on a laser diffractometry particle size analyzer. Thus, the A-B powder particle size ratio was 23.6. Differential scanning calorimetry measurements showed the solidus temperature of the bronze powder to be 850° C. and its liquidus temperature to be 1016° C. The melting point of the copper powder was taken to be that of pure copper, that is, about 1083° C., which exceeds the liquidus temperature of the bronze powder by 67° C.

Open-top containerized green samples were prepared from a dozen different powder mixtures in which volume fractions of the copper and bronze powders were varied as shown in Table 1.

Each sample was prepared by weighing out the copper and bronze powders on a laboratory balance to yield the desired volume fraction levels. The powders were blended together for 30 minutes in a Turbula® blender. The powder mixture was containerized by pouring it into a 20 ml alumina crucible and tapping it 20 strikes. The open containerized powder samples constituted the green articles in this example. The green article absolute density was measured by the mass-divided-by-volume method and the green relative density was calculated therefrom. These values appear in Table 1 for each sample. The green relative density increased as the volume fraction of the copper powder increased until the green relative density reached a peak at 73.2% for a copper powder volume fraction of 31% and decreased thereafter as the volume fraction of the copper volume fraction increased. The data shows that the green samples made from blends 2–6 had green relative densities that were significantly higher than that of the prior art blend 1 green article which was made from the bronze powder that had no copper powder additions.

The samples were placed in a tube furnace and heated at a rate of 5° C. per minute in an atmosphere of 80% nitrogen and 20% hydrogen to a sintering temperature, held at the sintering temperature for 30 minutes, and then cooled to room temperature. The sintered article absolute density of each sample was measured using the Archimedes method and the sintered article relative densities were calculated therefrom. Linear shrinkage was calculated for the samples after sintering based upon radial dimension measurements.

Solid state sintering below the bronze powder solidus temperature was conducted at 700° C. The data in Table 1 shows that the relative density of the sintered article generally increased as the volume fraction of the fine copper powder increased. The data in Table 2 shows that the linear shrinkage for the sintered samples generally increased as the volume fraction of the fine copper powder increased. This indicates that the addition of a volume fraction of fine copper powder increased the amount of solid state sintering.

Sintering of similarly prepared samples was done at 920° C. The data in Table 1 shows that the relative density of the sintered samples again generally increased as the volume fraction of the fine copper powder increased. The data in Table 2 shows that the linear shrinkage for the samples initially decreased as the volume fraction of the fine copper powder increased until a minimum of about 7.6% was reached at a 20% fine copper powder volume fraction. At higher volume fractions of the fine copper powder, the shrinkage generally increased as the volume fraction of the fine copper powder increased. Comparing this to the solid state sintering behavior, the unexpected result obtained is that the addition of a minor volume fraction of relatively fine copper powder to a major volume fraction of a relatively coarse bronze powder dimensionally stabilized the green article during super-supersolidus liquid phase sintering while providing an improvement in densification.

TABLE 1

| Blend No. | Volume Fraction Fine Powder (Copper) | Volume Fraction Coarse Powder (Bronze) | Green Article Absolute Density (g/cc) | Green Article Relative Density (%) | Solid State Sintered Article (700° C.) Absolute Density (g/cc) | Solid State Sintered Article (700° C.) Relative Density (%) | Supersolidus Liquid Phase Sintered Article (920° C.) Absolute Density (g/cc) | Supersolidus Liquid Phase Sintered Article (920° C.) Relative Density (%) |
|---|---|---|---|---|---|---|---|---|
| 1 | 0 | 100 | 5.282 | 59.3 | 5.491 | 61.6 | 7.753 | 87.0 |
| 2 | 10 | 90 | 5.676 | 63.7 | 5.955 | 66.8 | 7.906 | 88.7 |
| 3 | 20 | 80 | 6.117 | 68.6 | 6.629 | 74.3 | 8.034 | 90.1 |
| 4 | 30 | 70 | 6.503 | 72.9 | 6.950 | 77.9 | 8.179 | 91.6 |
| 5 | 31 | 69 | 6.529 | 73.2 | 6.880 | 77.1 | 8.259 | 92.5 |
| 6 | 40 | 60 | 6.303 | 70.6 | 7.043 | 78.9 | 8.188 | 91.7 |
| 7 | 50 | 50 | 5.908 | 66.1 | 7.158 | 80.1 | 8.223 | 92.0 |
| 8 | 60 | 40 | 5.691 | 63.7 | 7.098 | 79.4 | 8.236 | 92.1 |
| 9 | 70 | 30 | 5.374 | 60.1 | 7.185 | 80.3 | 8.305 | 92.8 |
| 10 | 80 | 20 | 5.203 | 58.1 | 7.208 | 80.5 | 8.391 | 93.8 |
| 11 | 90 | 10 | 4.843 | 54.1 | 7.244 | 80.9 | 8.464 | 94.5 |
| 12 | 100 | 0 | 4.717 | 52.6 | 7.420 | 82.8 | 8.311 | 92.8 |

TABLE 2

| Blend No. | Volume Fraction Fine Powder (Copper) | Volume Fraction Coarse Powder (Bronze) | Solid State Sintered Article (700° C.) Shrinkage (%) | Supersolidus Liquid Phase Sintered Article (920° C.) Shrinkage (%) |
|---|---|---|---|---|
| 1 | 0 | 100 | 0.9 | 10.9 |
| 2 | 10 | 90 | 1.3 | 8.9 |
| 3 | 20 | 80 | 2.7 | 7.6 |
| 4 | 30 | 70 | 4.2 | 8.4 |
| 5 | 31 | 69 | 4.1 | 9.0 |
| 6 | 40 | 60 | 5.0 | 9.0 |
| 7 | 50 | 50 | 6.2 | 10.1 |
| 8 | 60 | 40 | 6.7 | 11.1 |
| 9 | 70 | 30 | 8.5 | 13.3 |
| 10 | 80 | 20 | 9.9 | 15.4 |
| 11 | 90 | 10 | 11.8 | 16.4 |
| 12 | 100 | 0 | 15.2 | 18.0 |

Example 2

In Example 1, it was determined that a powder mixture of 31 volume percent copper powder and 69 volume percent bronze powder (blend 5) yielded the highest green relative density of the blends tested. In the present example, additional green article samples were prepared using this blend 5 powder mixture and using the bronze powder (blend 1) in the manner described in Example 1. The samples were sintered at temperatures ranging from 550 to 960° C. to determine sintering temperature sensitivity. Density measurements were made on the samples after sintering and are tabulated in Table 3.

The results show that the copper-bronze powder mixture samples sintered to a higher density at each sintering temperature than did the bronze powder samples. This demonstrates that a desired relative density can be achieved at a lower temperature with the blend 5 samples. For example, while a sintering temperature of 930° C. was required to achieve a relative density of 80% for a bronze powder sample, this density was achieved by sintering the copper-bronze powder mixture at only 860° C.

The results show that the copper-bronze powder mixture samples could be solid-supersolidus liquid phase sintered without slumping at a temperature that was 20° C. above the temperature at which slumping occurred in the bronze-only powder samples. Thus, the example illustrates the widening of the sintering temperature window by permitting a green article containing a fine metal powder/coarse prealloyed metal powder mixture to be sintered to a desirable relative density without slumping at temperatures that are both higher and lower than those that can be used for sintering a green article prepared only with the coarse prealloyed metal powder.

TABLE 3

| Sintering Temperature (° C.) | Bronze (Blend 1) Sintered Relative Density (%) | 31 Copper/69 Bronze (Blend 5) Sintered Relative Density (%) | Sintering Mode for Bronze Powder (Blend 1) | Sintering Mode for 31 Copper/69 Bronze Powder (Blend 5) |
|---|---|---|---|---|
| 550 | 59.5 | 70.4 | Solid state | Solid state |
| 600 | 59.8 | 75.6 | Solid state | Solid state |
| 650 | 60.2 | 77.9 | Solid state | Solid state |
| 700 | 60.6 | 78.9 | Solid state | Solid state |
| 750 | 60.5 | 79.2 | Solid state | Solid state |
| 800 | 60.7 | 79.4 | Solid state | Solid state |
| 850 | 62.1 | 79.5 | Supersolidus liquid phase | Solid-supersolidus liquid phase |
| 860 | 63.7 | 80.1 | Supersolidus liquid phase | Solid-supersolidus liquid phase |
| 870 | 65.8 | 81.0 | Supersolidus liquid phase | Solid-supersolidus liquid phase |
| 880 | 68.5 | 82.3 | Supersolidus liquid phase | Solid-supersolidus liquid phase |
| 890 | 71.6 | 84.4 | Supersolidus liquid phase | Solid-supersolidus liquid phase |
| 900 | 74.6 | 86.5 | Supersolidus liquid phase | Solid-supersolidus liquid phase |
| 910 | 77.1 | 87.6 | Supersolidus liquid phase | Solid-supersolidus liquid phase |
| 920 | 79.6 | 88.4 | Supersolidus liquid phase | Solid-supersolidus liquid phase |
| 930 | 80.1 | 89.5 | Supersolidus liquid phase | Solid-supersolidus liquid phase |
| 940 | Slumped | 90.2 | Supersolidus liquid phase | Solid-supersolidus liquid phase |
| 950 | Slumped | 92.8 | Supersolidus liquid phase | Solid-supersolidus liquid phase |
| 960 | Slumped | Slumped | Supersolidus liquid phase | Solid-supersolidus liquid phase |

Example 3

A-B powder mixtures were prepared using commercially pure nickel powder (carbonyl-derived nickel powder) as the relatively fine metal powder A and a nickel alloy (vendor grade designation, Superbond 625) as the relatively coarse prealloyed metal powder B. The nickel alloy powder was spherical and had a composition, in weight percent, of 21% chromium, 9% molybdenum, 4% columbium, 0.1% carbon, and balance nickel and was obtained from ANVAL Inc., of Rutherford, N.J., U.S. The pure nickel alloy was of spherical particle shape and was obtained from Chemalloy Company, Inc., of Bryn Mawr, Pa., U.S. The pure nickel powder had a mean particle size of about 10 microns and the nickel alloy powder had a mean particle size of about 79 microns as measured on a laser diffractometry particle size analyzer. Thus, the A-B powder particle size ratio was about 1:8. Differential scanning calorimetry measurements showed the solidus temperature of the nickel alloy powder to be 1270° C. and the liquidus temperature to be 1368° C. The melting point of the pure nickel powder was taken to be that of pure nickel, that is, about 1453° C., which exceeds the liquidus temperature of the bronze powder by 85° C.

Samples made from a blended mixture having 17.3% volume fraction of the pure nickel powder and 82.7% volume fraction of the nickel alloy powder were prepared in the same manner as was described in Example 1. Samples containing only the pure nickel alloy powder were likewise prepared. The green relative density of the blended mixture samples was 62.3% whereas that of the nickel alloy powder samples was only 58.6%.

The samples were sintered in a tube furnace. They were heated at a rate of 5° C. per minute in an atmospheric mixture of argon and hydrogen to a sintering temperature, held at the sintering temperature for 30 minutes, and then cooled to room temperature. The sintering temperatures were in the range of from 1216 to 1365° C. The sintered article absolute density of each sample was measured using the Archimedes method and the sintered article relative densities were calculated therefrom. The data is presented in Table 4.

The results show that both types of samples underwent solid state sintering at temperatures below the 1270° C. solidus temperature of the nickel alloy powder. However, the relative densities of the blended mixture samples were significantly higher than those of the nickel alloy powder samples.

Both types of samples showed greater densification when sintered at temperatures above 1270° C. The rate of increase in densification with temperature was much greater for the nickel alloy powder samples. Thus, even though the sintered relative density of the nickel alloy powder sample at 67.9% was significantly below the 74.0% of the blended mixture sample at the 1272° C. sintering temperature, the sintered relative densities for the 1315° C. sintering temperature of the two types of samples was nearly equal at about 80.5% for the nickel alloy powder sample and 80.9% for the blended mixture sample. By the 1329° C. sintering temperature, the nickel alloy powder sample sintered relative density had jumped up to 92.2% and by the 1338° C. sintering temperature, the nickel alloy powder sample had slumped. This indicates that the nickel alloy powder has a great sensitivity to the sintering temperature, making tight control of the furnace sintering temperature very critical. In contrast, the data illustrates a much lower sensitivity to the sintering temperature for the blended mixture samples. The increase in densification progressed with increasing temperature at a much slower rate than it did with the nickel alloy powder samples such that a sintered relative density of 92.5% was not reached until the sintering temperature was raised to 1356° C. Thus, the example illustrates that the blended powder mixture is much less sensitive to the sintering temperature.

Moreover, it was not until the 1365° C. sintering temperature was reached that slumping occurred for the blended mixture sample. Thus, the example demonstrates that the blend 5 samples were able to be sintered without slumping over a wider range of temperatures than could be the nickel alloy powder samples which did not contain a volume fraction of the relatively fine pure nickel powder.

TABLE 4

| Sintering Temperature (° C.) | Nickel Alloy (625) Sintered Relative Density (%) | 17.3 Nickel/ 82.7 Nickel Alloy Sintered Relative Density (%) | Sintering Mode for Nickel Alloy (625) Powder | Sintering Mode for 17.3 Nickel/ 82.7 Nickel Alloy Powder |
|---|---|---|---|---|
| 1216 | 62.4 | 72.5 | Solid state | Solid state |
| 1235 | 63.0 | 72.7 | Solid state | Solid state |
| 1254 | 64.6 | 72.9 | Solid state | Solid state |
| 1272 | 67.9 | 74.0 | Supersolidus liquid phase | Solid-supersolidus liquid phase |
| 1301 | 74.7 | 78.4 | Supersolidus liquid phase | Solid-supersolidus liquid phase |
| 1315 | 80.5 | 80.9 | Supersolidus liquid phase | Solid-supersolidus liquid phase |
| 1329 | 92.2 | 85.2 | Supersolidus liquid phase | Solid-supersolidus liquid phase |
| 1338 | Slumped | 87.8 | Supersolidus liquid phase | Solid-supersolidus liquid phase |

TABLE 4-continued

| Sintering Temperature (° C.) | Nickel Alloy (625) Sintered Relative Density (%) | 17.3 Nickel/ 82.7 Nickel Alloy Sintered Relative Density (%) | Sintering Mode for Nickel Alloy (625) Powder | Sintering Mode for 17.3 Nickel/ 82.7 Nickel Alloy Powder |
|---|---|---|---|---|
| 1347 | Slumped | 90.3 | Supersolidus liquid phase | Solid-supersolidus liquid phase |
| 1356 | — | 92.5 | Supersolidus liquid phase | Solid-supersolidus liquid phase |
| 1365 | — | Slumped | Supersolidus liquid phase | Solid-supersolidus liquid phase |

Example 4

In this example, a 700 gram sintered article of a complex shape was produced. The complex shape was a valve having convoluted internal passageways. The green article precursor of the sintered valve was made by the 3DP solid free-forming layer-wise buildup technique using a blended powder mixture similar to that described in Example 3, except that the mean particle size of the nickel powder was about 8 microns. The powder mixture was prepared in the manner described in Example 3.

The 3DP (Three Dimensional Printing) process allows a green article to be made directly from a computer model without the need for molds or dies. The process creates a green article by a layer-wise printing process in which a computer controlled print-head selectively deposits a fugitive binder onto each new powder layer that is applied to a powder bed supported on a vertically-indexable piston. The information for controlling the print-head is obtained by applying a slicing algorithm to the computer model. Powder particles in portions of each newly applied powder layer are selectively joined to each other and to particles in the previous layer by the "ink-jet"-like printing of the binder material from the print-head onto the powder layer. The powder bed is indexed downward after it has been selectively scanned by the print head and the next sequential layer is applied and selectively printed with the binder material. The process is repeated until the entire shape of the green article is formed. At the end of the process, the green article is separated from the rest of the powder bed, for example, by pouring off the loose powder.

In this example, the 3DP system that was used to make the green article was a RTP 300 unit manufactured by Extrude Hone Corporation of Irwin, Pa., U.S. An acrylic polymer binder was used. The relative density of the green part was determined to be 61.6%.

The green article was placed in an atmosphere furnace. Binder removal and presintering was accomplished by holding the green article first at 500° C. for 30 minutes and then at 950° C. for 30 minutes under a process atmosphere consisting of 95% argon and 5% hydrogen. The green article was then heated in a vacuum furnace at a rate of 5° C. per minute to a sintering temperature of 1335° C. and held for 45 minutes at that temperature, and then cooled to room temperature. Note that the 1335° C. sintering temperature employed is approximately the same temperature at which slumping occurred in the nickel alloy powder sample in Example 3, as can be seen by reference to Table 3. Nonetheless, the sintered article was found to have not undergone slumping. The relative density of the sintered article was determined to be about 92.5%.

This example was repeated an additional three times with nearly identical results each time.

A significant advantage illustrated by this Example is that densification was achieved without the use of the infiltrating operation that is usually required in conventional solid free-forming layer-wise buildup techniques. In such infiltration operations, a secondary liquid metal is wicked into the pores of the green article from a source external to the green article. The elimination of the infiltration operation reduces total process cost by reducing set-up processing and time and furnace time. It also avoids the technical difficulties and rejection costs associated with infiltrant erosion of the green article's printed skeleton. Moreover, the material properties of the final article do not need to be compromised by the presence an infiltrant as an article comprising just the constituent powders is made possible with the practice of embodiments of the present invention.

Although the instant example was conducted using the 3DP method, embodiments of the present invention utilizing solid free-forming layer-wise buildup techniques are not limited thereto, but rather include all known solid free-forming layer-wise buildup techniques which are compatible with the use of metal powder as a skeleton building block particle. Thus, embodiments include, without limitation, techniques in which light-activated photopolymer powders or liquids are mixed into, with or without a volatile liquid, or sprayed onto skeleton building block particles which are then layer-wise deposited in dry, spray, or slurry form and, possibly after an intermediary step of removing a volatile liquid, are subsequently cemented in place as part of the green article's printed skeleton by the selective application of light, for example, from a scanning laser or through a light-wavelength filtering mask, whether or not those techniques have heretofore utilized metal powders as skeleton building block particles. The green articles produced by these techniques may then be heated under suitable atmospheres or vacuum to remove the fugitive binders and then sintered to produce a densified article.

While only a few embodiments of the present invention have been shown and described, it will be obvious to those skilled in the art that many changes and modifications may be made thereunto without departing from the spirit and scope of the invention as described in the following claims.

What is claimed is:

1. A green article comprising a powder metal mixture having a minor volume fraction of a relatively fine metal powder and a complementary major volume fraction of a relatively coarse prealloyed metal powder, wherein the relatively fine metal powder is essentially solid at the highest sintering temperature at which the green article can be sintered without slumping, the relatively coarse prealloyed metal powder is amenable to supersolidus liquid phase sintering, and the ratio of the mean particle size of the relatively fine metal powder to the mean particle size of the relatively coarse prealloyed metal powder is at least about 1:5.

2. The green article of claim 1, wherein the relatively fine metal powder consists of two or more elemental metals or metal alloys, each of said elemental metals or metal alloys being essentially solid at the highest sintering temperature at which the green article can be sintered without slumping.

3. The green article of claim 1, wherein the relatively coarse prealloyed metal powder consists of two or more metal alloys, each of said metal alloys being amenable to supersolidus liquid phase sintering.

4. A green article comprising a powder metal mixture having a minor volume fraction of a relatively fine metal powder and a complementary major volume fraction of a relatively coarse prealloyed metal powder, wherein said minor volume fraction of a relatively fine metal powder consists of at least two sub-fractions of successively finer mean particle size, each of said successive sub-fractions consists of metal powder that is essentially solid at the highest sintering temperature at which the green article can be sintered without slumping, the relatively coarse prealloyed metal powder is amenable to supersolidus liquid phase sintering, the ratio of the mean particle size of the coarsest of said successive sub-fractions to the mean particle size of the relatively coarse prealloyed metal powder is at least about 1:5, and the ratio of the mean particle size of each finer successive sub-fraction to the mean particle size of an immediately preceding coarser successive sub-fraction is at least about 1:5.

5. The green article of claim 4, wherein at least one of the successive sub-fractions consists of two or more elemental metals or metal alloys, each of said elemental metals or metal alloys being essentially solid at the highest sintering temperature at which the green article can be sintered without slumping.

6. The green article of claim 4, wherein the relatively coarse prealloyed metal powder consists of two or more metal alloys, each of said metal alloys being amenable to supersolidus liquid phase sintering.

* * * * *

UNITED STATES PATENT AND TRADEMARK OFFICE
CERTIFICATE OF CORRECTION

PATENT NO. : 6,746,506 B2  Page 1 of 1
DATED : June 8, 2004
INVENTOR(S) : Liu et al.

It is certified that error appears in the above-identified patent and that said Letters Patent is hereby corrected as shown below:

Column 5,
Line 35, "articles" should read -- article --.

Column 7,
Line 38, "consist one" should read -- consist of one --.

Column 9,
Lines 8 and 23, "is a set" should read -- are a set --.

Column 10,
Line 47, "regard the" should read -- regard to the --.

Column 11,
Line 59, "is" should read -- are --.

Column 18,
Line 17, "was" should read -- were --.

Column 20,
Line 35, "presence an" should read -- presence of an --.

Signed and Sealed this

Twenty-third Day of November, 2004

JON W. DUDAS
*Director of the United States Patent and Trademark Office*